Jan. 16, 1940.　　　A. J. LAUBY　　　2,187,475

ARTIFICIAL BAIT

Filed Aug. 27, 1938

Inventor
A. J. Lauby

By

Attorneys

Patented Jan. 16, 1940

2,187,475

UNITED STATES PATENT OFFICE 2,187,475

ARTIFICIAL BAIT

Anton J. Lauby, Marshfield, Wis.

Application August 27, 1938, Serial No. 227,121

1 Claim. (Cl. 43—46)

My invention refers to artificial baits, and it has for its object to provide a simple, economical, and effective buoyant bait in the form of a minnow or plug, solid in cross section and carrying a wire strand or support embedded centrally thereof.

The specific object of my invention is to provide an elongated solid plug of the buoyant variety, oval or circular in cross section, and having a wire strand centrally embedded therein and extending from end to end, terminating with eyes for attachment to a hook or gang of hooks at one end, and a leader or line at the other end.

With the above and other minor objects in view, the invention consists in such peculiarities of construction and combination of parts, as will be hereinafter fully set forth with respect to the accompanying drawing and subsequently claimed.

Figure 1:
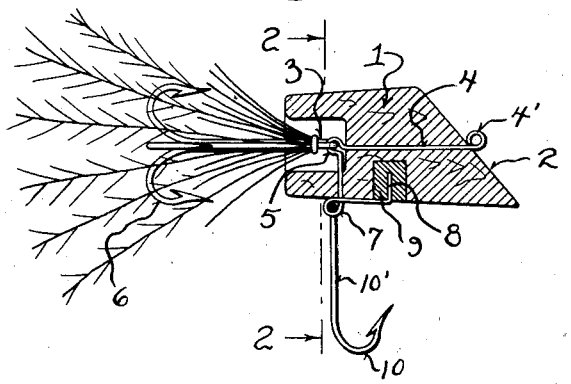
Figure 1 represents a sectional elevation of the artificial bait, embodying the features of my invention, the section being indicated by line 1—1 of Figure 2.

Referring by characters to the drawing, the numeral 1 represents a fibrous solid plug to thus provide buoyancy, the said plug being formed with an inclined nose 2, whereby life or zig-zag motion is produced as the bait is drawn through the water. The rear of the plug is provided with a tubular cavity 3, and passing through the center of the plug is a wire reinforcing strand 4. This strand enters the base of the tubular cavity and is there bowed to form a loop 5 for the reception of a gang of hooks 6, which may be feathered or not, depending upon the nature of the taste of the user.

It will be noted that the cavity at the rear of the plug not only serves as a protection for the housed hook joint within the same, but said cavity or cup also develops a suction or vacuum effect when the bait is drawn through the water, to cause vibration of the trailing gang of hooks.

The strand 4, after being folded to form the loop 5, is turned down at a right angle, and passes through the body of the plug to the outer surface, at which point it is again twisted to form a loop 7. The end of this loop is extended forwardly and bent upwardly as at 8 for securing purposes. The leg 8 is preferably embedded in the lead slug 9 which is formed in the surface of the plug, whereby said plug is normally held by gravity in correct position for producing the desired movement as it travels through the water. The eye 7 may carry a hook or gang of hooks 10, as shown.

Figure 2:
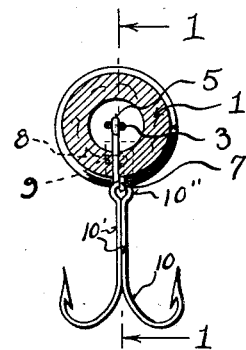
Figure 2 is a cross section of the same.
Figure 2:

As best illustrated in Figure 2 of the drawing, the preferred form of hook is of the double variety, and the legs 10' of the same are brought together somewhat in the shape of a safety pin folded into an eye 10'' for engagement with the wire strand eye 7. By this arrangement the hooks can be reversed when desired. For example, as shown in Figure 1 of the drawing, the barbed hook end is extended forwardly, but by removing the hook from the eye 7 the position can be reversed, whereby the barb will extend rearwardly.

As noted in Figure 4 of the drawing, the body of the minnow is circular or oval in cross section, and intermediate of the ends of the minnow body there is embedded vertically therein a wire clip 11, which is formed into an eye 11' at the bottom extending from the body, and said clip is folded over at its upper portion to form clinching legs, as shown. The eye 11' obviously is adapted to receive the hook or hooks.

This minnow formed of artificial bait is particularly desirable for bass, or other game fish, due to the fact that it will travel through the water in imitation of the movement of a minnow, and it has been found that the same is a very effectual lure.

While I have described my invention minutely as to details of construction, it is understood that I may vary the structure thereof to come within the scope of my claim.

I claim:

An artificial bait comprising a buoyant elongated solid body, and a pull wire centrally embedded therein from end to end, said wire having a loop intermediate its ends for the attachment of hooks, the wire being bent at a right angle from said loop and extending transversely through the body, the right angle end terminating with another loop for the attachment of a second set of hooks.

ANTON J. LAUBY.